Patented Apr. 21, 1925.

1,534,196

UNITED STATES PATENT OFFICE.

JOHN F. WERDER, OF DENVER, COLORADO, ASSIGNOR TO THE ZIP MANUFACTURING CO., OF DENVER, COLORADO, A CORPORATION OF COLORADO.

ABRASIVE COMPOUND.

No Drawing. Application filed March 28, 1921. Serial No. 456,171.

*To all whom it may concern:*

Be it known that I, JOHN F. WERDER, a citizen of the United States, residing at Denver, in the county of Denver, State of Colorado, have invented certain new and useful Improvements in Abrasive Compounds, of which the following is a description.

This invention relates to abrasive compounds, and more particularly to metal grinding compounds for use in grinding valves of gas engines and pumps, for lapping pistons into cylinders, for grinding shafts in bearings, and for all other work requiring the use of an abrasive compound of this nature.

In my prior Patent No. 1,353,197, granted September 21, 1920, I disclose a grinding compound which was composed of ingredients entirely free of oil, in particular a compound composed of powdered abrasive, a starch binder and water. This compound has proven slightly objectionable, due to the fact that the water content causes the compound to freeze when subjected to cold which is unavoidable during transportation. After freezing, the compound becomes lumpy and dries up too quickly when left standing for any length of time, necessitating the addition of a surprisingly large amount of water to restore the compound to proper working consistency. This is objectionable to the trade.

In experimenting to correct this freezing tendency of the compound, I have introduced various amounts of calcium chloride and other non-freezing agents, and found in each case that the non-freezing ingredients impaired the effectiveness of the abrasive. In particular, the action of the calcium chloride on the starch was to convert the compound into a sort of oily, syrupy paste with an appreciable loss of abrasive property, due probably to the unctious characteristic of the resultant compound. For the purpose of overcoming these objectionable features, the present invention is devised.

The principal object of this invention is therefore, to provide a non-oily, non-freezing and non-drying compound having all the effective abrasive qualities of my prior compound.

A further object of this invention is to provide an abrasive compound of the above qualities which will make up as a substantially creamy paste of uniform consistency and easy to handle.

In working to these ends, I have discovered that certain clays readily adapt themselves as binders for the abrasive grains in combination with a non-oily liquid, particularly water, and that there is no deleterious effect produced when a non-freezing ingredient is added, such as calcium chloride, the compound working up into a creamy paste which picks up readily on the finger, this being the general method used in the trade by mechanics for applying the grinding compounds. In this latter respect, the new compound is decidedly superior to my prior compound containing starch for the reason that the starch gives the compound a jelly-like consistency, whereas, clay produces a creamy paste, much easier to handle.

I have found that fat clays which are characteristically plastic, absorb water, and have great binding power, are adaptable for my purpose, particularly those fat clays which are free of grit and large pieces of silicate. In some cases where the fat clays are too fat, it is practicable to add desired quantities of finely comminuted silicate in order to bring the binder up to the required consistency to hold together the added abrasive grains. In all cases, it is imperative that the pieces of silicate or grit in the clay be smaller than the abrasive grains.

While these fat clays are best adapted for my use, because of their plasticity, I prefer a clean washed clay in which the silicate content is very fine, smaller than the grain of the added abrasive content. I prefer to use kaolin or China clay, which is remarkably free from foreign matter.

In certain instances, where a real fine abrasive ingredient is used, such as 3F or 4F carbide of silica, I find whiting particularly desirable, for the reason that it is difficult to obtain clay which is entirely free of particles of silica which are smaller than the fine grains of the abrasive required. As long as the pieces of silica are not larger than the abrasive grains, they will do no harm during the grinding operation, but if larger silica grains are present, they will cause appreciable scratches in the metal face.

It has been found most desirable to add a non-drying agent such as glycerine to prevent the objectionable drying out, and also a small amount of lime or the like to neutralize the acid effect of the calcium chloride, to prevent rusting.

The specific proportion by volume of the compound is substantially as follows: ten parts clay; ten parts abrasive; six to eight parts of water; one to two parts of glycerine; three and one-half pounds of calcium chloride to the gallon; and a small percentage of lime to neutralize the acid effect of the calcium chloride.

In mixing and combining the ingredients, I first make about a sixty percent solution of calcium chloride and water. To make such a thoroughly saturated solution, it is necessary to heat the water to about boiling point, and to stir thoroughly. One part of this sixty percent solution can then be added to three parts of water, which makes a twenty percent solution and saves heating the whole quantity of water. I then add the glycerine and clay or whiting, where a fine abrasive powder is to be used. After thoroughly dissolving the clay or whiting, the abrasive powder is stirred in, after which the mixture is put in containers ready for use.

It must be understood that I do not restrict this invention to the above portions of such ingredients, nor the manner in which they are mixed together, since these matters may be varied considerably without departing from the spirit of the invention as set forth in the appended claims.

The present compound, by reason of the clay or whiting binder, easily soluble in water, due to the combined action of the friction and water, releases more easily the grains of abrasive so as to accomplish a more even and ready distribution of the abrasive without the accumulation of the grains at any particular point, thus avoiding, as in the case of abrasives employing oil, the making of grooves and uneven surfaces. It is also found that the present abrasive will work with much greater rapidity, and is easier to be applied than my former compound, since it makes up and maintains itself as a substantially creamy paste of even consistency in contra-distinction to the jelly-like consistency of my former compound in which starch or other glutinous binder is used.

Having thus described the invention, what I claim as new and desire to secure by Letters Patent, is:—

1. A metal grinding preparation free from oil comprising a non-alkaline plastic clay, an abrasive, water, calcium chloride, lime and glycerine.

2. A metal grinding preparation free from oil comprising clay, an abrasive, water and calcium chloride.

3. A metal grinding preparation free from oil comprising a fat clay, silicate, water and an abrasive.

4. A metal grinding preparation free from oil comprising kaolin clay, an abrasive, water and a non-freezing element.

5. A metal grinding preparation free from oil comprising kaolin, an abrasive, water and a non-drying element.

6. A metal grinding preparation free from oil comprising whiting, an abrasive and a non-oily liquid.

7. An abrasive compound including in its composition an abrasive material, a binder, water and calcium chloride.

8. A metal grinding preparation free from oil comprising an abrasive, water, a binder and a preservative.

9. A metal grinding preparation free from oil comprising clay, an abrasive, water, silicate and calcium chloride.

In testimony whereof I affix my signature.

JOHN F. WERDER.